Dec. 14, 1948. J. G. MARESCO 2,456,520
CASTER
Filed Dec. 31, 1946
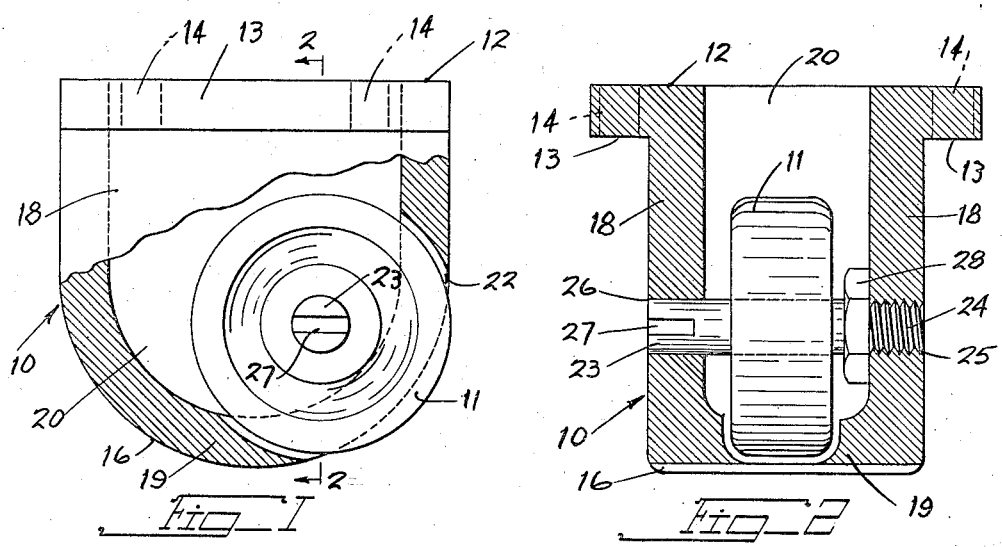
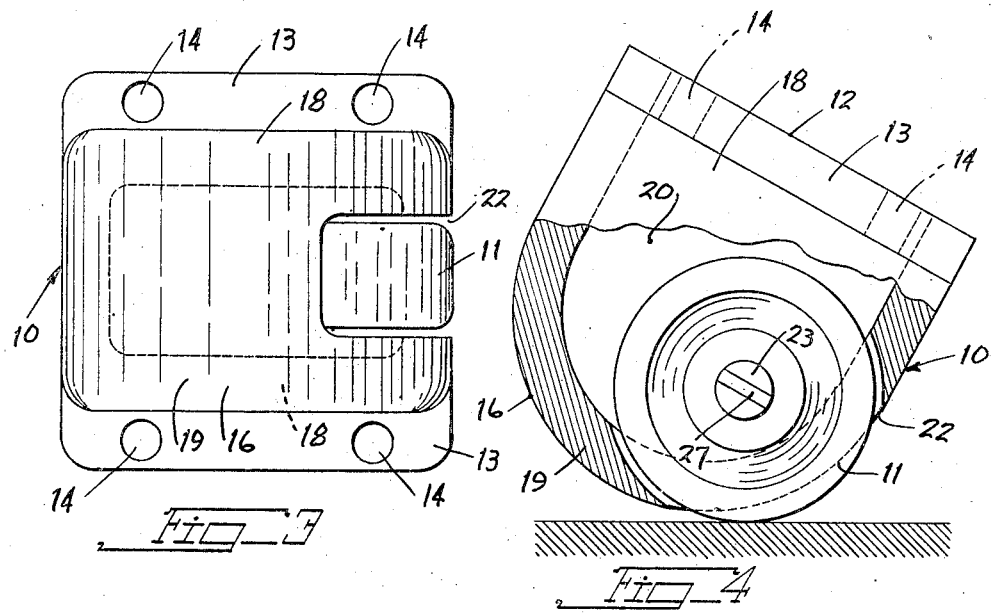
INVENTOR.
JOSEPH G MARESCO
By Edward Gottlieb
ATTORNEY.

Patented Dec. 14, 1948

2,456,520

UNITED STATES PATENT OFFICE 2,456,520

CASTER

Joseph G. Maresco, Bronx, N. Y.

Application December 31, 1946, Serial No. 719,458

1 Claim. (Cl. 16—40)

This invention relates to new and useful improvements in casters.

More particularly, this invention proposes a new caster which in one position is adapted to support an object in a stationary position in which the object may be used, and in another position is adapted to support the object so that it may be easily shifted. This may be better understood by realizing that the rollers of conventional casters always engage the floor or ground while supporting objects and with this arrangement the articles are not securely held and may easily shift and move. While the old conventional type casters is satisfactory for many articles such as chairs and other pieces of furniture, it is highly unsatisfactory for other articles, for example, ladders, welding sets, etc. If the conventional casters are used on a ladder, the ladder is insecure since its bottom may roll away while the ladder is being used. The same is true of a welding set. This is also true of heavy pieces of furniture.

With the new caster, in accordance with this invention, the article, such as the ladder or welding set, or heavy piece of furniture, is held immovable in working position in so far as it is not resting on the rollers of the casters. Yet when it is desired to move the article around it is merely necessary to adjust the article so as to adjust the position of the casters and then the rollers will enage the floor or ground and the article may be easily moved about.

Another object of this invention resides in characterizing the new caster by the fact that it includes a casing and a roller mounted on the casing a short distance above its bottom so that normally the roller does not engage the ground. It is proposed that the casing be provided with a top weight supporting surface for attachment on the bottom of an article which is to be supported. It is further proposed to provide the casing with a bottom curved cam-like surface for resting on the floor or ground for normally supporting the article in a stationary working position and or tilting said casing when said article is tilted for lowering and engaging said roller against the floor or ground for receiving the weight of said article so that it may be easily moved.

An important feature of this invention resides in the fact that the new and improved caster is no larger than present day casters and that it may be easily attached to any article to be supported and which is to operate as already made clear.

A still further object of the invention resides in constructing the casing of the caster in a certain way and in associating the roller with the casing in a certain way so as to produce an exceptionally simple construction which may be manufactured and sold at a low cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a side elevational view of a caster constructed in accordance with this invention, a portion of the casing thereof being broken away to disclose interior parts.

Fig. 2 is a transverse vertical sectional view taken on the line 2—2 of Fig. 1.

Fig. 3 is a bottom view of the caster shown in Fig. 1.

Fig. 4 is an elevational view similar to Fig. 1 but illustrating the caster in a tilted position in which the roller is engaging the ground.

The new caster, in accordance with this invention, includes a casing 10 and a roller 11 mounted on said casing a short distance above its bottom. The casing 10 is provided with a top weight supporting surface 12 for attachment on the bottom of an article which is to be supported. To facilitate attaching the casing 10 in position it is provided with flanges 13 having openings 14 for supporting bolts or screws, not illustrated on the drawing. The casing 10 is also provided with a bottom curved cam-like surface 16 for resting on the floor or ground for normally supporting said article in a stationary working position and for facilitating the tilting of the casing 10 when said article is tilted for lowering and engaging the roller 11 against the floor or ground, as illustrated in Fig. 4, so that the roller 11 receives the weight of the article which may then be easily moved about.

The casing 10 has side walls 18 and a bottom wall 19 completely enclosing a space 20 within the casing. This space 20 opens up at the top of the casing. The roller 11 may be engaged into position within said casing by placing it in through the open top of the space 20. The roller 11 is mounted within the casing 10 in a position so as to have a small edge portion thereof projecting through an opening 22 formed in the walls of the casing 10. This opening 22 is formed in the junction of the side walls 18 and the bottom wall 19 of the casing. The roller 11 is supported in position on a shaft 23. This shaft 23 is mounted between opposed side walls 18 on the casing. The shaft 23 has a threaded end 24 which threadedly engages a threaded opening 25 formed in one of the side walls 18. The other end of the shaft 23 engages in an opening 26 formed in the opposite side wall 18. This latter end of the shaft 23 is provided with a slot 27 for a screw driver or other turning implement. A lock nut 28 is threadedly engaged on the threaded end 24 of the shaft 23 and abuts the inside face of one of the side walls 18 for securely locking the shaft 23 in position.

The operation of the new caster may be understood from the following:

The caster is intended to be mounted upon the bottom of an article which is normally to be supported in a stationary working position. It is secured in place by engaging the top weight supporting surface 12 against the bottom of the article, and then engaging fastening elements through the openings 14 into the article. In the normal working position of the article the bottom curved cam-like surface 16 rests on the floor or ground. The roller 11 is a slight distance above the floor or ground. For this reason the article will be relatively firmly held in position and will not shift or move around. When it is desired to move the article it is merely necessary to tilt the article forwards, which may be easily done because of the curved cam-like surface 16. By tilting the article, the casing 10 is tilted until it reaches the position shown in Fig. 4. In this position the roller 11 rests on the floor or ground. Now the article may be easily moved about on the roller 11.

One or more of the casters may be used for supporting an article, depending upon conditions.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

A caster, comprising a casing, a roller mounted on said casing a short distance above its bottom, said casing having a top weight supporting surface for attachment on the bottom of an article which is to be supported, and said casing also having a bottom curved cam-like surface for resting on the floor or ground for normally supporting said article in a stationary working position and for tilting said casing when said article is tilted for lowering and engaging said roller against the floor or ground for receiving the weight of said article so that it may be easily moved about, said casing having side walls and a bottom wall completely enclosing a space within said casing, and said roller being mounted within said casing and having a small edge portion projecting through an opening in the walls of said casing.

JOSEPH G. MARESCO.

REFERENCES CITED

The following references are of record in the file of this patent:

UNITED STATES PATENTS

| Number | Name | Date |
| --- | --- | --- |
| 1,012,404 | Means | Dec. 19, 1911 |

FOREIGN PATENTS

| Number | Country | Date |
| --- | --- | --- |
| 7,432 | Great Britain | 1889 |
| 407,028 | Germany | Dec. 10, 1924 |